United States Patent [19]

Tsuneki et al.

[11] Patent Number: 4,666,609

[45] Date of Patent: May 19, 1987

[54] WATER TREATMENT AGENT

[75] Inventors: Takao Tsuneki, Ebina; Shinji Ano, Yokohama; Takahiko Uchida, Yamato; Tomoyasu Imai, Kawasaki; Masaru Okamoto, Yamato; Hideo Ohtaka; Hiromi Murakami, both of Yokohama, all of Japan

[73] Assignee: Kurita Water Industries Ltd., Tokyo, Japan

[21] Appl. No.: 790,719

[22] Filed: Oct. 24, 1985

[30] Foreign Application Priority Data

Nov. 14, 1984 [JP] Japan .................................. 59-239968

[51] Int. Cl.$^4$ ................................................. C02F 5/12
[52] U.S. Cl. ..................................... 210/701; 252/180; 252/181; 422/16; 422/17
[58] Field of Search ................ 252/180, 181; 210/701; 422/16, 17

[56] References Cited

U.S. PATENT DOCUMENTS

| | | | |
|---|---|---|---|
| 2,723,956 | 11/1955 | Johnson | 252/181 |
| 3,215,680 | 11/1965 | Kolodny | 252/180 |
| 3,663,448 | 5/1972 | Ralston | 252/180 |
| 3,898,037 | 8/1975 | Lange et al. | 210/701 |
| 4,223,120 | 9/1980 | Kurowsky | 252/180 |
| 4,306,991 | 12/1981 | Hwa et al. | 252/180 |
| 4,374,733 | 2/1983 | Snyder et al. | 252/180 |
| 4,389,324 | 6/1983 | Keller | 252/180 |

*Primary Examiner*—Robert A. Wax
*Attorney, Agent, or Firm*—Flynn, Thiel, Boutell & Tanis

[57] ABSTRACT

A water treatment agent to be used by adding it to water systems, such as, those in boiler plant and water cooling circulation system, for preventing both corrosion and scale formation on the metal surfaces held in contact with water in the water systems, comprising, as effective components, a polymer product having maleic acid or maleic anhydride unit and a polymer product having acarylamide or methacrylamide unit.

16 Claims, No Drawings

WATER TREATMENT AGENT

FIELD OF THE INVENTION

The present invention relates to a water treatment agent for preventing both corrosion and scale formation in lines and installations in water systems.

PRIOR ART

Metal surfaces held in contact with water in, for example, cooling water systems, water systems for boiler plants and so on are apt to undergo troubles due to corrosion and scale formation. In open circulating cooling water systems where the rate of blow down of the circulating water is settled to be low on account of economization of energy and resources, the tendency of occurrence of corrosion and scaling trouble in the system becomes high with simultaneous enhancement of formation of scales from calcium salts, magnesium salts, silica and so on, since the salts contained in the make up water are concentrated in a correspondingly high proportion and the total salt concentration in the circulating water becomes thus high.

As the corrosion inhibitor for such water systems, there have heretofore been proposed those containing a polymer product having maleic acid or maleic anhydride unit together with a molybdenum salt [Japanese Patent Publication Sho 58(1983)-27348] and those containing a polymer product having acrylamide or methacrylamide unit together with a zinc salt [Japanese Patent Publication Sho 57(1982)-59308]. On the other hand, there have been known anti-scaling agents containing a polymer product having maleic acid or maleic anhydride unit [Japanese Patent Publication Sho 53(1978)-20475] and containing a polymer product having acrylamide or methacrylamide unit (U.S. Pat. No. 3,085,916) respectively.

These anti-corrosion and anti-scaling agents of the prior art use either the maleic polymer product or the acrylamide polymer product solely and the effect of prevention of corrosion or scale formation achieved is not satisfactory. Especially, in water systems in which the total salt concentration in the water is high, such as, as mentioned above, in open circulating cooling water systems where a low rate of blow down of the circulating water is employed, no complete prevention of corrosion or of formation of scales of, in particular, silicic nature can be attained. In addition, the corrosion inhibitors mentioned above contain, as an indispensable component, a molybdenum salt or a zinc salt, which may be problematic in the point of view of safety hazard or environmental pollution.

SUMMARY OF THE INVENTION

An object of the present invention is to provide a water treatment agent in which the difficulties in the prior art mentioned above have been obviated.

Another object of the present invention is to provide a water treatment agent having superior effect for preventing both corrosion and scale formation.

A further object of the present invention is to provide a water treatment agent in which a concurrent use of heavy metal salt can be dispensed with.

The essential feature of the water treatment agent according to the present invention resides in that it comprises, as effective components, a polymer product having maleic acid or maleic anhydride units and a polymer product having acrylamide or methacrylamide units.

DETAILED DESCRIPTION OF THE INVENTION

The polymer product having maleic acid or maleic anhydride units employed as a first polymer component of the water treatment agent according to the present invention contains structural units of maleic acid or the anhydride thereof. Examples of such a polymer product include homopolymers of maleic acid or of maleic anhydride and copolymers of maleic acid or maleic anhydride with another monomer, such as, isobutylene, isopentene, styrene sulfonic acid, acrylic acid, methacrylic acid and so on.

A suitable polymer product having maleic acid or maleic anhydride units contains the structural units of maleic acid or its anhydride in an amount of at least 10 mole %, preferably at least 25 mole %, and has a molecular weight in the range from 200 to 100,000 preferably from 500 to 40,000. The polymer product having maleic acid or maleic anhydride units may preferably be used in a form of a water soluble salt, such as, sodium, potassium or ammonium salt.

The polymer product having acrylamide or methacrylamide units as a second polymer component of the water treatment agent according to the present invention contains structural unit of acrylamide or methacrylamide. Examples of such a polymer product include homopolymers of acrylamide and methacrylamide, copolymers of them, copolymers of one of the foregoing with another monomer, partial hydrolysis products of the foregoing polymers and Hofmann degradation products of the foregoing polymers. The partial hydrolysis products may be those obtained by partial hydrolysis of the Hofmann degradation products. The Hofmann degradation products may include those obtained by Hofmann degradation of the partial hydrolysis products.

Those which are particularly preferable are polyacrylamide, polymethacrylamide, Hofmann degradation products of these, Hofmann degradation products of partial hydrolysis products of polyacrylamide or polymethacrylamide and partial hydrolysis products of Hofmann degradation products of polyacrylamide or polymethacrylamide. Suitable polymer products having acrylamide or methacrylamide units contain the structural units of acrylamide or methacrylamide in an amount of at least 10 mole %, preferably at least 50 mole % and have a molecular weight in the range from 200 to 40,000, preferably from 200 to 5,000. The partial hydrolysis products may preferably be used in a form of water-soluble salt, such as, sodium salt etc. The Hofmann degradation products may preferably be used in a form of a water-soluble acid addition salt, such as, hydrochloride, hydroacetate etc.

The water treatment agent according to the invention contains a polymer product having maleic acid or maleic anhydride units and a polymer product having acrylamide or methacrylamide units as the essential components, wherein the proportion of the polymer having maleic acid or maleic anhydride units to the polymer having acrylamide or methacrylamide units may preferably be in the range of 99:1–1:99, based on the weight, in particular in the range from 9:1 to 1:9.

The water treatment agent according to the present invention may contain, in addition to these essential components, other additives, such as, other corrosion inhibitors, other anti-scaling agents, anti-slime agents and so on.

Water systems to be treated adequately by the water treatment agent according to the present invention include those which encounter troubles due to corrosion and scale formation, such as, open circulating- or closed circulating cooling water systems, once-through cooling water systems, water systems for boiler plants, water systems for geothermal power plants and so on, especially those in which the total salt concentration is high, as in the case of open circulating cooling water systems bringing forth corrosive water that enhances also the formation of silicious scales.

The water treatment agent according to the present invention offers, when added as such or in the form of an aqueous solution to the water system to be treated, suppression of corrosion of metals held in contact with water in, such as, heat exchangers, pipe lines, vessels, reactors and so on, together with prevention of formation of scales from calcium salts, magnesium salts, silica etc.

It is preferable to subject the water system to be treated by the water treatment agent according to the present invention preliminarily to an initial treatment (protective layer forming treatment) using a protective layer-forming corrosion inhibitor, such as those containing phosphate, organic phosphonate and so on.

While an adequate amount of the water treatment agent according to the present invention to be used depends not only on the internal parameters, such as, the concentration of corrosive ions, for example, chloride, sulphate etc., and the concentrations of scale-forming components, such as, M-alkalinity, calcium hardness, magnesium hardness and silica, but also on the external parameters, such as, pH-value of the water, water temperature and the temperature of metal surface held in contact with water, an amount in the range from 1 to 500 mg/l, preferably from 2 to 100 mg/l may be used in general. A concurrent use of other corrosion inhibitors, anti-scaling agents, anti-slime agents and so on may be effected upon requirements.

By adding the water treatment agent according to the present invention to a water system, corrosion of metals of, such as, heat exchangers, pipe lines, vessels, reactors etc., held in contact with water is suppressed and, at the same time, the formation of scales from calcium salts, magnesium salts, silica and so on is also prevented. Here, the effect of prevention of scale formation is particularly high for the silicious scales. Since the effect of suppression of corrosion and the effect of prevention of scale formation were found to be far superior as compared with those for the cases where either of the component polymers, namely, polymer product having maleic acid or maleic anhydride unit or the polymer product having acrylamide or methacrylamide unit, is solely used, a synergistic effect of the two is clearly indicated.

As described above, by the concurrent use of the two polymer products according to the present invention, a far superior effect of prevention of both corrosion and scale formation is achieved as compared with the case in which either of these components is employed solely. The effect of suppression of corrosion and the effect of prevention of formation of the silicious scales are quite high, especially, when the water treatment agent according to the present invention is applied for water systems exhibiting high corrosive property due to high total salt concentration of the water, as in the case of open circulating cooling water system operating with lower rate of blow down of the circulating water.

PREFERRED EMBODIMENT OF THE INVENTION

In the following, the invention will be described by way of Examples.

An open circulating cooling water system including a heat exchanger having a heating area of 0.25 $m^2$ and containing circulating water in an amount of 0.45 $m^3$ supplied by a make up water prepared from Yokohama city tap water with addition of an amount of deionized water and some salts was operated so as to maintain 5 cycles of concentration for 30 days. The tubes of the heat exchanger made of a carbon steel [STB 35 of JIS (Japanese Industrial Standard) G 3461] covered by mill scale and having an external diameter of 19 mm were subjected preliminarily to an initial treatment with sodium hexametaphosphate for one day. The water temperature was 30° C. at the inlet of the heat exchanger and was 50° C. at the outlet. The flow velocity of the circulating water was adjusted to 0.5 m/sec. The circulating water had a pH of 9.0, an electric conductivity of 1,500 $\mu$S/cm, an M-alkalinity of 250 mg/l, a calcium hardness of 250 mg/l, a magnesium hardness of 125 mg/l, silica content of 100 mg/l, chloride ion concentration of 250 mg/l and a sulfate ion concentration of 125 mg/l.

To this water system, a water treatment agent containing a polymer product having maleic acid or maleic anhydride unit and another polymer product having acrylamide or methacrylamide unit, as given in Table 1, was added in a predetermined amount. The maximum depth of pitting observed on the heat exchanger tubes after 30 days and the rate of scale formation thereon were determined.

For the sake of comparison, similar tests were carried out under the sole use of each of the polymer products together with a blank test without addition of water treatment agent, the results of which are summarized in table 2.

From Table 2, it is clearly shown, that the water treatment agent according to the present invention reveals a superior effect on the prevention of both corrosion and scale formation as compared with those of Comparison Examples, even in a water system operating at a high cycle of concentration and containing silica.

TABLE 1

| Symbol | Polymer Product | Molecular Weight |
|---|---|---|
| A | Homopolymer of maleic acid | 1,000 |
| B | Copolymer of maleic acid/ isobutylene (1:1 in mole) | 25,000 |
| C | Copolymer of maleic acid/ isopentene (1:1 in mole) | 25,000 |
| D | Homopolymer of acrylamide | 850 |
| E | Hofmann degrad. product of polyacrylamide with 43.2 mole % degradation | 3,600 |
| F | Hofmann degrad. prod. of part. hydrolysis product of polyacrylamide with 2.8 mole % hydrolysis and 8.3 mole % degradation | 850 |

TABLE 2

| | Polymer Product and Amount of Addition (in mg/l) | Maximum Depth of Pitting (mm) | Rate of Scale Formation (mg/cm²/month) |
|---|---|---|---|
| Examples according to the Invention | A (20) + D (20) | 0.14 | 7 |
| | B (20) + D (20) | 0.12 | 6 |
| | C (20) + D (20) | 0.13 | 7 |
| | B (20) + D (10) | 0.13 | 7 |
| | B (10) + D (20) | 0.14 | 8 |
| | A (20) + E (20) | 0.14 | 8 |
| | A (20) + F (20) | 0.14 | 8 |
| Comparison Examples | A (20) | 0.25 | 15 |
| | B (20) | 0.26 | 16 |
| | C (20) | 0.26 | 16 |
| | D (20) | 0.32 | 18 |
| | E (20) | 0.31 | 20 |
| | F (20) | 0.30 | 20 |
| | Blank Test | 0.41 | 25 |

What is claimed is:

1. A water treatment agent, consisting essentially of a blend of
    (A) a first polymer component selected from the group consisting of homopolymers of maleic acid, homopolymers of maleic anhydride, copolymers of maleic acid with isobutylene or isopentene, copolymers of maleic anhydride with isobutylene or isopentene and water-soluble salts thereof
    (B) a second polymer component selected from the group consisting of homopolymers of acrylamide, homopolymers of methacrylamide, Hofmann degradation products of polyacrylamide Hofmann degradation products of polymethacrylamide and water-soluble salts thereof,
    wherein the weight ratio of A:B is from 9:1 to 1:9.

2. A method for treating circulating water in open circulation cooling water systems operating at a high concentration ratio and being apt to suffer from formation of silicic scale on surfaces that contact the water, which comprises mixing with the water an amount of water treatment agent as claimed in claim 1 effective to prevent corrosion and scale formation on surfaces that contact the water.

3. A water treatment agent according to claim 1, wherein the molecular weight of said first polymer component is in the range of from 500 to 40,000.

4. A water treatment agent according to claim 1, wherein the molecular weight of said second polymer component is in the range of from 200 to 5,000.

5. A water treatment agent as claimed in claim 1, wherein units of maleic acid or maleic anhydride comprise at least 25 mole % of said first polymer component and acrylamide or methacrylamide units comprise at least 50 mole % of said second polymer component.

6. A water treatment agent as claimed in claim 1, wherein units of maleic acid or maleic anhydride comprise at least 10 mole % of said first polymer component and acrylamide or methacrylamide units comprise at least 10 1 mole % of said second polymer component.

7. A water treatment agent as claimed in claim 1 in which said first polymer component is a homopolymer of maleic acid.

8. A water treatment agent as claimed in claim 1 in which said first polymer component is a 1:1 copolymer of maleic acid and isobutylene.

9. A water treatment agent as claimed in claim 1 in which said first polymer component is a 1:1 copolymer of maleic acid and isopentene.

10. A water treatment agent as claimed in claim 1 in which said second polymer component is a homopolymer of acrylamide.

11. A water treatment agent as claimed in claim 1 in which said second polymer component is a Hofmann degradation product of polyacrylamide.

12. A water treatment agent as claimed in claim 1 in which said second polymer component is a Hofmann degradation product of a partially hydrolyzed polyacrylamide.

13. A water treatment agent as claimed in claim 1 in which the weight ratio of A:B is from 2:1 to 1:2.

14. A method as claimed in claim 2 in which the water treatment agent is incorporated in the water in an amount in the range of 1 to 500 mg/l.

15. A method as claimed in claim 2 in which the water treatment agent is incorporated in the water in an amount in the range of 2 to 100 mg/l.

16. A method as claimed in claim 2 in which the water treatment agent is incorporated in the water in an amount in the range of 30 to 40 mg/l.

* * * * *

UNITED STATES PATENT AND TRADEMARK OFFICE
CERTIFICATE OF CORRECTION

PATENT NO. : 4 666 609

DATED : May 19, 1987

INVENTOR(S) : Takao TSUNEKI et al

It is certified that error appears in the above-identified patent and that said Letters Patent is hereby corrected as shown below:

Column 6, line 16; change "10 1 mole %" to ---10 mole %---.

Signed and Sealed this

Twenty-second Day of December, 1987

Attest:

DONALD J. QUIGG

Attesting Officer

Commissioner of Patents and Trademarks